Aug. 23, 1938.  F. HEDEN  2,127,595
MEANS OF DYEING
Filed Nov. 27, 1936
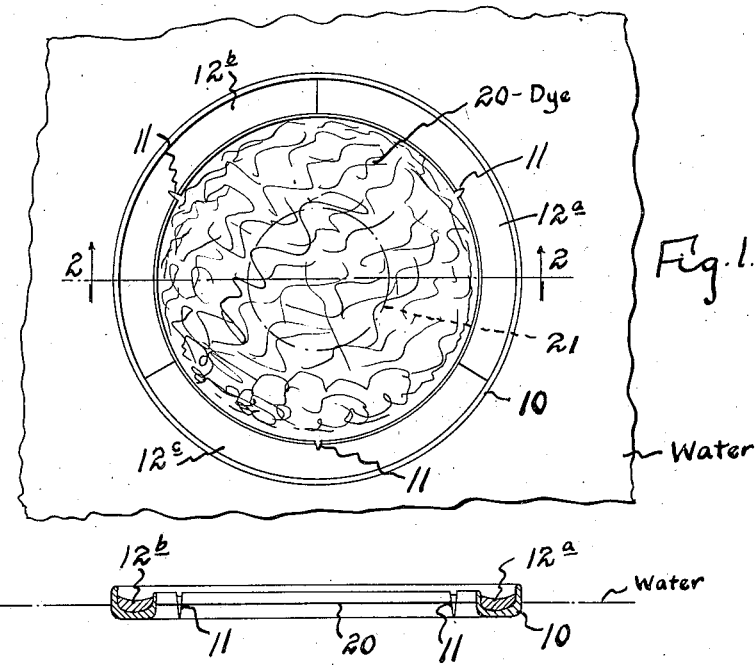
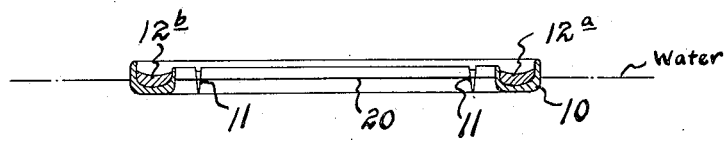
INVENTOR.
Felke Heden
BY Darby & Darby
ATTORNEYS.

Patented Aug. 23, 1938

2,127,595

UNITED STATES PATENT OFFICE 2,127,595

MEANS OF DYEING

Folke Heden, Brooklyn, N. Y., assignor to Fred Fear & Co., Brooklyn, N. Y., a corporation of New York Application November 27, 1936, Serial No. 112,924

6 Claims. (Cl. 91—12)

This invention relates to improvements in a method and means of dyeing articles, and particularly Easter eggs.

The invention involves a support for the dyes constructed of a material so that it will float in a liquid such as water. This support is provided with one or more dyes, preferably in solid form, such as colored waxes, and a series of openings through which the dye or dyes may gradually seep onto the surface of the liquid in which the container floats and in the space defined by the container.

The many objects which result from the use of a device of this type, as well as the method, will be set forth in full detail below.

This invention resides substantially in the apparatus and method as defined in the following specification when taken in connection with the attached drawing and pointed out in the claims.

In the drawing—

Figure 1 is a plan view of the device of this invention illustrated diagrammatically as floating on the surface of a body of water; and Figure 2 is a cross-sectional view taken on the line 2—2 of Figure 1.

The support 10 is shown in the form of an annulus having a groove on its upper surface, as is clear from Figure 2. This annulus, or ring, may have any suitable cross-section and any suitable shape without departure from the invention. The ring is preferably of closed configuration, but may be octagonal, hexagonal, circular, triangular, rectangular, and in fact any form but preferably defining an enclosed area. The upper surface may be formed in any way to provide a container, as for example it may be grooved, as shown in the drawing. The support 10 need not be closed however, but may be open at one side or may even be a straight bar or a solid polygon.

In the groove thus formed is placed one or more dyes or coloring materials. It is preferable to use colored waxes, that is oil soluble dyes, or water soluble dyes incorporated in oil. There are many well known forms of dyes of this nature which are suitable for the purpose. The groove formed in the ring is filled with one or more of these dyes. As illustrated in Figure 1, three different colors 12a, 12b, and 12c are shown in the ring in separate contiguous bodies of arcuate form.

The ring is provided on its inner lip with one or more notches or openings 11, one for each of the different dye bodies. In some cases more than one notch or opening for each dye body may be employed, and in the case of a dye body of a single color a plurality of notches or openings may likewise be employed. It will be clear from Figure 2 that these notches expose the dye bodies to the action of the water.

In use the container or ring is deposited on the surface of a body of water, which is preferably heated to the point of boiling. The contact between the hot water and the colored bodies through the notches or openings 11 causes a gradual seepage of these dyes onto the surface of the water within the ring, as indicated at 20 in Figure 1. The dyes employed, as will be noted above, are of the type which will float on the surface of the water and will not be dissolved in it or bleed down into the body of the water. Where the support does not form an enclosed area, the sides of the vessel containing the liquid in which the support floats will limit the area of the dye film. The film thus formed in either case blocks the grooves to prevent further seepage until the film is depleted.

The egg or other body to be colored, as indicated by the dot and dash line 21, is submerged in the body of water down through the color film 20 within the ring until it is completely submerged. It is then withdrawn up through the layer of color, which has become mixed into a variegated or marbled configuration so that a coat or film of the color adheres to the surface of the object. As the object is withdrawn through the color film, and a substantial portion of the coloring material withdrawn, the action of the hot water on the color bodies through the notches is repeated so that additional colors are melted and flow onto the surface of the water.

It has been found that as soon as the area within the ring is completely filmed with dye the film blocks off the notches and prevents any further seepage of color or dye until after a depletion of the film by passage of an object through it. By reason of this fact just a sufficient amount of dye is supplied for each application of color to the object, after which a fresh supply seeps onto the surface of the water. From experience it has been found that the replenishing of the dye film is quite rapid, so that little time is lost between the dyeing of successive objects.

As noted above, the container may be made of any material which will float on water, such as wood, plastic compositions, and the like. Any material having a specific gravity lower than that of water will suffice for the purpose, so long as it is not materially affected by the hot water.

From the above description it will be apparent to those skilled in the art that the invention is not limited in its scope to the particular form illustrated in the drawing, but may be varied considerably by those skilled in the art without departure from the true scope thereof. I do not, therefore, desire to be strictly limited to the disclosure, as given for the purpose of illustration.

I claim:

1. A device as described comprising a container adapted to flat on water, said container having a plurality of apertures in the wall at the water line, and a body of dye in the container which is not miscible with water, the dye being exposed to the water through said apertures.

2. In a device of the type described the combination comprising an apertured container capable of floating on water, said container having a plurality of dye bodies mounted therein so as to contact with the water through said apertures, whereby the dye may seep through the apertures onto the surface of the water adjacent the container.

3. A device of the type described comprising a ringlike body having a plurality of apertures on the inner wall, dye bodies of different colors mounted on said ringlike body so as to contact the water through said apertures, whereby the dyes may seep through the apertures onto the surface of the water in which the ringlike member floats.

4. A device of the type described comprising a grooved ring capable of floating on water, the inner wall of the groove having a plurality of apertures therein, a plurality of bodies of dyes mounted in the groove so as to be exposed to water when the ring floats thereon through said apertures whereby the dye seeps onto the surface of the water over the area within the ring.

5. A device as described comprising a support adapted to float on a liquid, said support having a plurality of apertures in the wall at the liquid line, and a body of dye in the container not miscible with the liquid, the dye being exposed to the liquid through said apertures whereby the formation of a film on the surface of the liquid by seepage through the apertures blocks them until the film is depleted.

6. A device as described comprising a support capable of floating on water and having an opening therethrough and a body of water insoluble dye on the support so as to be in contact with the water, when the body floats thereon, exposed in the opening of the support to form a dye film on the water, confined by the support.

FOLKE HEDEN.

CERTIFICATE OF CORRECTION.

Patent No. 2,127,595. August 23, 1938.

FOLKE HEDEN.

It is hereby certified that error appears in the printed specification of the above numbered patent requiring correction as follows: Page 2, first column, line 12, claim 1, for the word "flat" read float; and that the said Letters Patent should be read with this correction therein that the same may conform to the record of the case in the Patent Office.

Signed and sealed this 18th day of October, A. D. 1938.

(Seal)

Henry Van Arsdale
Acting Commissioner of Patents.